United States Patent [19]

Horikawa

[11] Patent Number: 5,065,022

[45] Date of Patent: * Nov. 12, 1991

[54] RADIATION IMAGE RECORDING AND READ-OUT APPARATUS

[75] Inventor: Kazuo Horikawa, Kanagawa, Japan

[73] Assignee: Fuji Photo Film Co., Ltd., Kanagawa, Japan

[*] Notice: The portion of the term of this patent subsequent to Jul. 11, 2006 has been disclaimed.

[21] Appl. No.: 296,727

[22] Filed: Jan. 13, 1989

[30] Foreign Application Priority Data

Mar. 19, 1988 [JP] Japan .................................. 63-66741
Mar. 19, 1988 [JP] Japan .................................. 63-66742

[51] Int. Cl.⁵ .............................................. G01N 23/04
[52] U.S. Cl. .................................................. 250/327.2
[58] Field of Search ...................... 250/327.2, 484.1

[56] References Cited

U.S. PATENT DOCUMENTS

| | | | |
|---|---|---|---|
| 4,258,264 | 3/1981 | Kotera et al. | 250/484.1 |
| 4,543,479 | 9/1985 | Kato | 250/327.2 |
| 4,563,077 | 1/1986 | Komada | 355/212 |
| 4,634,264 | 1/1987 | Takahashi | 355/200 |
| 4,847,499 | 7/1989 | Horikawa | 250/327.2 K |
| 4,947,043 | 8/1990 | Shimura | 250/327.2 K |

FOREIGN PATENT DOCUMENTS

| | | |
|---|---|---|
| 0072466 | 2/1983 | European Pat. Off. |
| 0077678 | 4/1983 | European Pat. Off. |
| 56-11395 | 2/1981 | Japan |

*Primary Examiner*—Carolyn E. Fields
*Attorney, Agent, or Firm*—Sughrue, Mion, Zinn, Macpeak & Seas

[57] ABSTRACT

A radiation image recording and read-out apparatus includes a recording belt in the form of an endless belt having a stimulable phosphor layer and a recording belt coveying roller system including a plurality of rollers. The recording belt conveying roller system is provided with a tension roller which is urged by a spring to outwardly tense the recording belt, and the spring is connected to a tension releasing member which causes the spring to release the tension roller.

5 Claims, 11 Drawing Sheets

RADIATION IMAGE RECORDING AND READ-OUT APPARATUS

BACKGROUND OF THE INVENTION

Field of the Invention

This invention relates to a radiation image recording and read-out apparatus for exposing a stimulable phosphor to radiation in order to store a radiation image therein, scanning the stimulable phosphor with a stimulating ray to cause the stimulable phosphor to emit light in a pattern corresponding to the radiation image stored therein, and reading out the emitted light to obtain an electric image signal, and more particularly to such an apparatus in which a radiation image is stored in a stimulable phosphor layer formed on an endless belt.

Description of the Prior Art

When certain kinds of phosphors are exposed to a radiation such as X-rays, $\alpha$-rays, $\beta$-rays, $\gamma$-rays, cathode rays or ultra-violet rays, they store part of the energy of the radiation. Then, when the phosphor which has been exposed to the radiation is exposed to a stimulating ray such as visible light, light is emitted from the phosphor in proportion to the amount of radiation energy which was stored by the phosphor. A phosphor exhibiting such properties is referred to as a stimulable phosphor.

As disclosed, for instance, in U.S. Pat. No. 4,258,264 and Japanese Unexamined Patent Publication No. 56(1981)-11395, there has been proposed a radiation image recording and reproducing system in which a radiation image of an object such as the human body is recorded and reproduced by the use of such a stimulable phosphor. Specifically, in this system a recording medium bearing thereon a stimulable phosphor layer is first exposed to radiation which has passed through an object in order to store a radiation image of the object in the stimulable phosphor layer, and then the stimulable phosphor layer is two-dimensionally scanned with a stimulating ray which causes it to emit light in a pattern corresponding to the stored radiation image. The light emitted from the stimulable phosphor layer upon stimulation thereof is detected photoelectrically and converted into an electric image signal, which is processed to reproduce the radiation image as a visible image on a recording medium such as a photosensitive material, a display system such as a CRT, or the like.

This system is advantageous over conventional radiography using a silver halide photosensitive recording material in that a radiation image can be recorded over a much wider radiation energy intensity exposure range. That is, it has been found that the intensity of light emitted from the stimulable phosphor upon stimulation thereof after it is exposed to radiation remains proportional to the energy of the radiation to which it was exposed for a very wide radiation energy intensity range. Accordingly, even if the energy intensity range of the radiation to which the stimulable phosphor is exposed varies substantially due to changes in the recording conditions, a visible radiation image independent of variations in the radiation energy intensity range can be obtained by choosing an appropriate gain when converting the light emitted from the phosphor upon stimulation into an electric signal.

In the radiation image recording and read-out apparatus, the recording medium bearing thereon the stimulable phosphor layer (herebelow referred to as "a stimulable phosphor recording medium") is used for temporarily storing the radiation image before forming a visible image on a final recording medium. Accordingly, the stimulable phosphor recording medium can be used repeatedly, and it is desired for economical reasons that the stimulable phosphor recording medium be used repeatedly.

Thus, we have proposed a radiation image recording and read-out apparatus in which the stimulable phosphor recording medium can be circulated and reused with a high efficiency. (See U.S. Pat. No. 4,543,479, for instance.)

The apparatus comprises a recording medium support, a stimulable phosphor recording medium which has a stimulable phosphor layer and is affixed to the recording medium support, an image recording section for exposing the recording medium to radiation which has passed through an object in order to store a radiation transmission image of the object therein, an image read-out section having a photoelectric read-out means which scans the recording medium storing therein the radiation image with a stimulating ray to cause it to emit light and reads out the light emitted from the recording medium to obtain an electric image signal, means for circulating the recording medium with respect to the image read-out section, and an erasing section which eliminates residual radiation energy on the recording medium after read out of the radiation image in the image read-out section and before another radiation image is recorded on the recording medium, the sections and means being incorporated into a unit. As the recording medium, a type comprising an endless belt-like base material with a plurality of stimulable phosphor layers formed thereon are very convenient. That is, the recording medium is passed around rollers and the like and conveyed in order to move the stimulable phosphor layers through the image recording section, the image read-out section and the erasing section in sequence.

We have further proposed a radiation image recording and read-out apparatus in which a recording belt comprising a stimulable phosphor layer formed on an endless belt-like base material is used as the stimulable phosphor recording medium, and which can be small in size and can effect highly accurate scanning of the recording belt with a stimulating ray in the image read-out section. (See U.S. Patent Application Ser. No. 143,919, now U.S. Pat. No. 4,847,499.) In this apparatus, the endless recording belt is passed through a pair of roller sections which are spaced from each other by a distance substantially equal to the length of one radiation image frame, and the image recording section is disposed so as to act on the recording belt between the roller sections. This arrangement permits one dimension of the apparatus to be reduced to substantially the length of one radiation image frame. Further, in the apparatus described above, a stimulating ray is caused to scan the recording belt on the peripheral surface of a roller. Since the recording belt runs most stably on the peripheral surface of the roller, the arrangement prevents wobbling of the recording belt and permits the stimulating ray to scan the recording belt accurately.

In the apparatus where an endless recording belt is used as the recording medium, the recording belt has to be conveyed during circulation in a stable way so that it does not become slack, or the like. For this purpose, it is preferred that a tension roller urged so as to impart tension to the recording belt be provided. However, though the recording belt can be conveyed accurately in a stable way during operation of the apparatus by virtue of the tension roller, the recording belt can deteriorate in a short time due to the tension constantly imparted thereto by the tension roller.

SUMMARY OF THE INVENTION

In view of the foregoing observations and description, the primary object of the present invention is to provide a radiation image recording and read-out apparatus in which an endless recording belt can be conveyed accurately without becoming slack or the like and at the same time, deterioration of the endless recording belt can be suppressed effectively In accordance with a first aspect of the present invention, there is provided a radiation image recording and read-out apparatus which comprises a recording belt in the form of an endless belt having a stimulable phosphor layer, a recording belt conveying roller system which comprises a plurality of rollers around which the recording belt is passed and which conveys and circulates the recording belt, an image recording section in which the stimulable phosphor layer on the recording belt is exposed to radiation which has passed through an object in order to store a radiation image of the object therein, an image read-out section comprising a stimulating light source which emits stimulating light for scanning the stimulable phosphor layer and a photoelectric read-out means which reads out light emitted from the stimulable phosphor layer in response to being scanned by the stimulating light and which obtains an electric image signal, and an erasing section which eliminates residual radiation energy on the stimulable phosphor layer after read out of the radiation image in the image read-out section and before another radiation image is recorded thereon, said recording belt conveying roller system being provided with a tension roller which is urged by an urging means to tense outwardly the recording belt, and the urging means being connected to a tension releasing means which causes the urging means to release the tension roller.

The times when the tension roller is released from the urging means by the tension releasing means depend on the frequency of use of the apparatus, the material used for the recording belt, and the like.

By providing a tension roller in the recording belt conveying system, the recording belt can be conveyed in a stable way, at the same time, by releasing the tension imparted to the recording medium by the tension releasing means when the apparatus is not in operation, deterioration of the recording belt can be minimized.

In accordance with a second aspect of the present invention, there is provided a radiation image recording and read-out apparatus which comprises a recording belt in the form of an endless belt having a stimulable phosphor layer, a recording belt conveying roller system which comprises a plurality of rollers around which the recording belt is passed and which conveys and circulates the recording belt, an image recording section in which the stimulable phosphor layer on the recording belt is exposed to radiation which has passed through an object in order to store a radiation image of the object therein, an image read-out section comprising a stimulating light source which emits stimulating light for scanning the stimulable phosphor layer and a photoelectric read-out means which reads out light emitted from the stimulable phosphor layer in response to being scanned by the stimulating light and which obtains an electric image signal, and an erasing section which eliminates residual radiation energy on the stimulable phosphor layer after read out of the radiation image in the image read-out section and before another radiation image is recorded thereon, said recording belt conveying roller system being provided with a tension roller which is urged by an urging means to outwardly tense the recording belt and being adapted to convey the recording belt in a standby conveyance mode when the apparatus is inoperative.

The standby conveyance mode may be any mode of conveyance provided that the whole recording belt can be positioned uniformly on the respective rollers without particular parts of the recording belt remaining continuously on the rollers. For example, the standby conveyance mode includes a mode in which the recording belt is fed continuously forward at a very low speed, and a mode in which the recording belt is fed intermittently forward. Further, whether the apparatus is inoperative may be determined on the basis of the frequency of use of the apparatus or the like. Since deterioration of the recording belt is promoted by a long concentration of bending stress on the parts of the recording belt which are positioned on the rollers when the recording belt is stopped, the service life of the recording belt can be extended by preventing particular parts of the recording belt from remaining long on the rollers. For this purpose, in the apparatus described above, the recording belt is conveyed even when the apparatus is not in operation.

In either of the apparatuses in accordance with the first and second aspects of the present invention, it is preferred in view of the desired miniaturization of the apparatus that the recording belt conveying roller system include a pair of roller sections which are spaced from each other by a predetermined distance which is not shorter than the length of the largest radiation image which can be recorded in the recording section and not longer than 1.5 times the same and that the recording belt be circulated between the roller sections along the predetermined distance. The predetermined distance is measured between the most remote edges of the roller sections.

DESCRIPTION OF THE PREFERRED EMBODIMENTS

Figure 1:
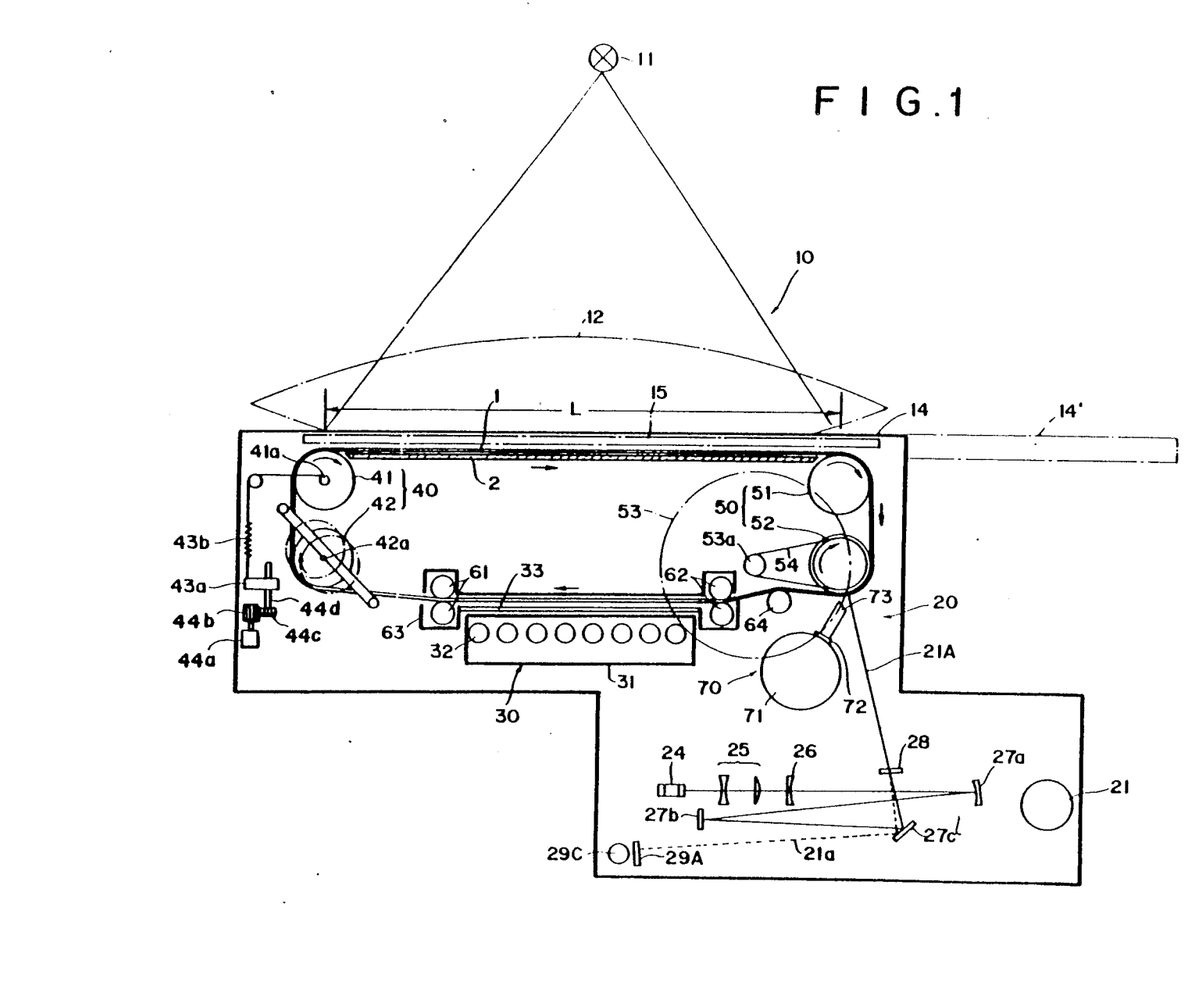
FIG. 1 is a schematic side view showing a radiation image recording and read-out apparatus in accordance with a first embodiment of the present invention.
Figure 2:
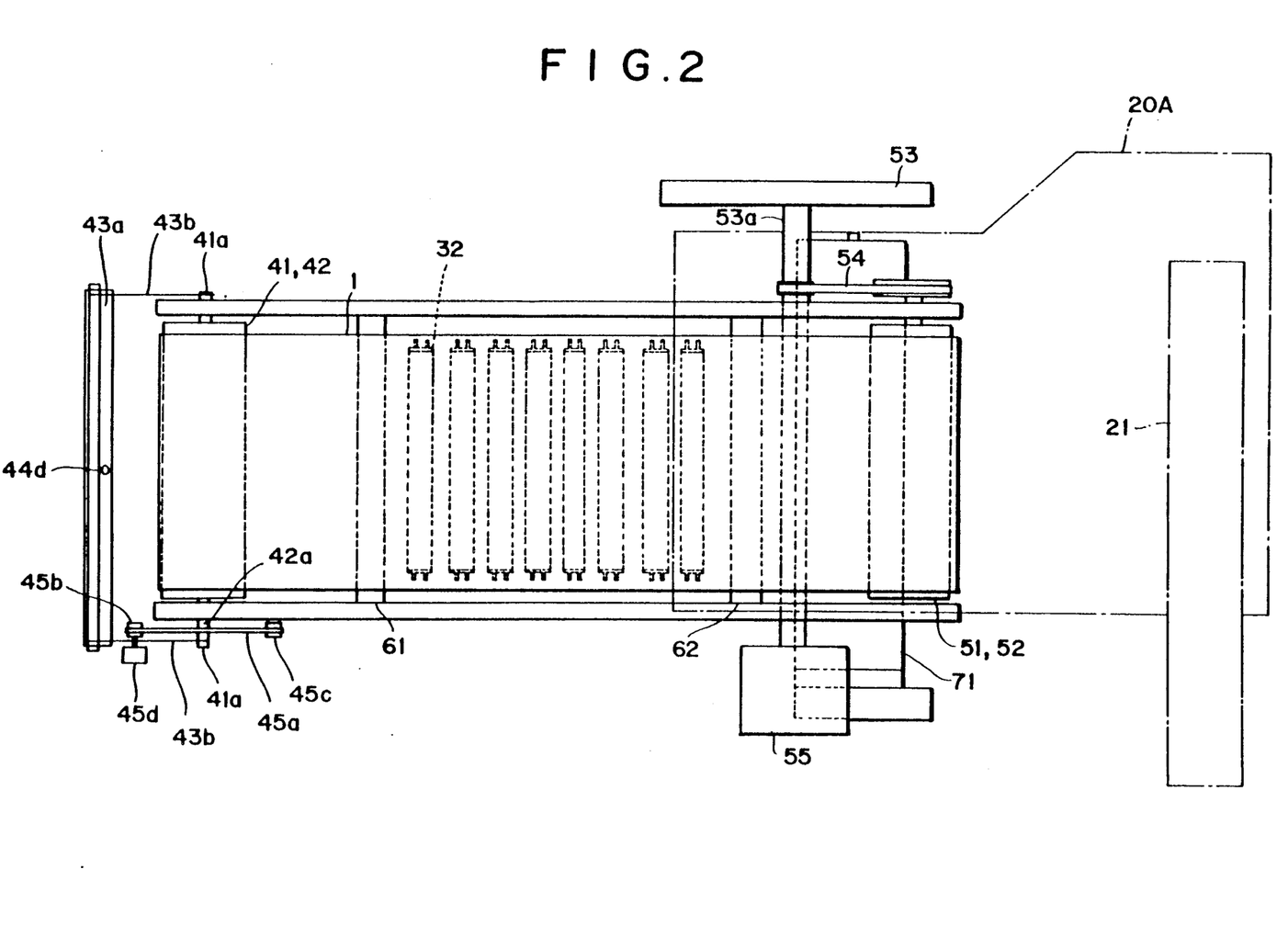
FIG. 2 is a plan view of a part of the apparatus.

In FIGS. 1 and 2, a recording belt 1 has a stimulable phosphor layer formed on the entire area thereof, and is passed around first and second roller sections 40 and 50 in order to be circulated in the direction of the arrows in FIG. 1. The first roller section 40 comprises a pair of rollers 41 and 42 and the second roller section 50 comprises a pair of rollers 51 and 52, and the roller sections 40 and 50 are spaced from each other by a distance L (the distance as measured from the center of one section to the center of the other). The first and second roller sections 40 and 50 together with two pairs of nip rollers 61 and 62 and a roller 64 (to be described later) form a recording belt conveying roller system in this particular embodiment.

A radiation source 11 (e.g., an X-ray source) is disposed so as to oppose the recording belt 1 from above. The upper part of the apparatus shown in FIG. 1 including the radiation source 11 and a recording table 14 on which an object is placed forms a radiation image recording section 10. When the radiation source 11 is operated with an object placed on the recording table 14, the recording belt 1 is exposed to the radiation which has passed through the object 12, and a radiation image of the object 12 is stored in the stimulable phosphor layer on the recording belt 1. The center-to-center distance L between the roller sections 40 and 50 is substantially equal to the length of one radiation image frame recorded on the recording belt 1. The term "one radiation image frame" used herein denotes the radiation image frame which is the largest in size among various image frames which can be recorded by the particular apparatus, e.g., half, quarter, sexpartite, and the like. When the size of the radiation image to be recorded is smaller than "one radiation image frame", the radiation image is recorded on the recording belt 1 at the center of the upper run of the recording medium.

Depending upon the part of the object to be radiographed, a grid device 15 such as a Potter-Bucky grid device 15 may be provided between the recording table 14 and the recording belt 1. That is, when a relatively thick part of an object, such as the chest of a human body, is radiographed, diffused radiation emitted from the object upon radiographing can deteriorate the quality of the radiation image obtained. In such cases, a grid device having a grid for absorbing the diffused radiation or a Potter-Bucky grid device comprising such a grid and a means for moving the grid back and forth should be provided between the object and the recording belt 1. When a Potter-Bucky grid device is provided in an apparatus where read-out of radiation image information is carried out simultaneously with the recording of a radiation image, as in an embodiment which will be described later, the acceleration in the movement of the Potter-Bucky grid should be controlled by properly arranging a spring to drive the grid or by properly controlling the rotational speed of a motor which drives the grid so that the grid does not vibrate which can adversely affect the read out of the radiation image in the read-out section.

The recording belt 1 is held in a predetermined position where a recording area thereof is opposed to the radiation source 11 while recording of the radiation image is carried out, and when the recording is completed, the recording belt 1 is conveyed by the rollers 41, 42, 51, and 52, which rotate in the directions indicated by the respective arrows, so that the recording area which has been exposed to the radiation is brought to an image read-out section 20 which is disposed adjacent to the right side portion of the lower run of the recording belt 1. Of the rollers 41, 42, 51, and 52, the roller 52 is a drive roller connected to an output shaft 53a of a motor 53 with a belt (or chain) 54, and the other rollers 41, 42, and 51 are driven rollers. Further, as shown in FIG. 2, a rotary encoder 55 is mounted on the output shaft 53a of the motor and detects the degree of rotation of the motor 53 to utilize it in various control operations.

The roller 41 in the first roller section 40 has a shaft 41a and a pair of springs 43b connected to opposite ends of the shaft 41a at one end and to a support plate 43a at the other end, thereby urging the roller 41 to tense the recording belt. That is, the roller 41 is a tension roller. A motor 44a is connected to a gear 44b which meshes with a gear 44c fixedly provided on the lower end of a screw rod 44d, and the screw rod 44d is engaged with the support plate 43a to move the support plate 43a up and down in response to rotation thereof. Thus, the support plate 43a is moved up and down in response to rotation of the motor 44a, and the tension imparted to the recording belt 1 by the springs 43b can be adjusted by rotating the motor 44a. The tension roller 41 stabilizes the running of the recording belt 1 and prevents slack in the recording medium while the recording belt 1 is conveyed, thereby permitting accurate conveyance of the recording belt 1. The roller 42 of the first roller section 40 has a shaft 42a. One end of the shaft 42a is attached to a belt 45a which is passed around a pair of rollers 45b and 45c and is conveyed by the rotation of a motor 45d connected to the roller 45b (FIG. 2). That is, the end of the shaft 42a of the roller 42 can be moved by rotating the motor 45d. When the recording belt 1 meanders, the movement of the recording belt can be corrected by obliquely displacing the roller 42. When the parts of the recording belt 1 upstream downstream from roller 42 make an angle of 90° with each other, meandering of the recording belt 1 can be prevented without changing the distance over which the recording belt is conveyed by moving the end of the roller 42 so that the roller 42 is held in a plane which is at 45° with respect to both the directions of conveyance of the recording belt 1 upstream and downstream from the roller 42 as shown in FIG. 1.

Figure 3:
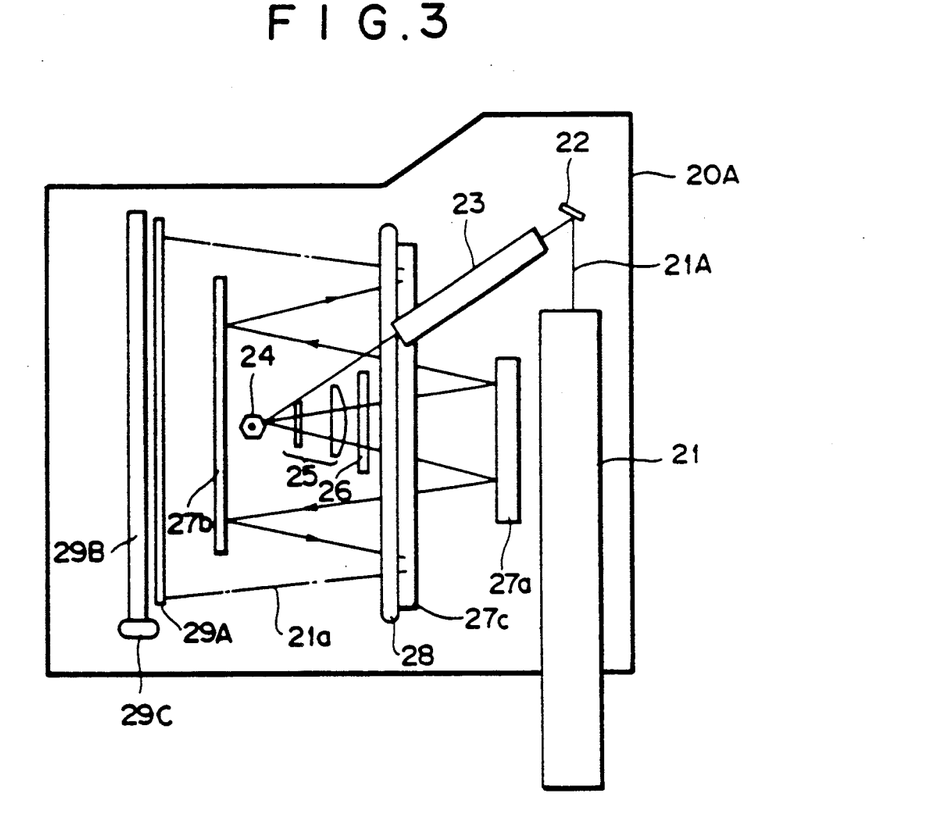
FIG. 3 is a plan view showing the optical system of the image read-out section employed in the apparatus.

By means of the roller sections 40 and 50, the part of the recording belt 1 storing therein the radiation image is fed to the image read-out section 20, where the radiation image is read out. Now the image read-out section 20 will be described in detail with reference to FIG. 3 in addition to FIGS. 1 and 2. FIG. 3 is a plan view of an optical platen 20A (FIG. 2) in which an optical system for scanning the recording belt 1 with a stimulating light beam is accommodated.

The image read-out section 20 includes a stimulating ray source 21 which extends perpendicular to the direction in which the recording belt is conveyed and emits a stimulating ray 21A. The stimulating ray source 21 may comprise an He-Ne laser, for example. A rotary polygonal mirror 24 for deflecting the stimulating ray 21A so that it scan the recording belt 1 across the width thereof (main scanning) is disposed in the optical path of the stimulating ray 21A. That is, as is clearly shown in FIG. 3, the stimulating ray 21A emitted from the stimulating ray source 21 is reflected by a mirror 22, and impinges upon the rotary polygonal mirror 24 after passing through an incident optical system 23 having a beam expander, a cylindrical lens and the like. Then the stimulating ray 21A is deflected by the polygonal mirror 24, travels through a scanning optical system 25 comprising an fθ lens and the like and through a cylindrical lens 26, and then impinges upon the part of the recording belt 1 on the lower peripheral surface of the roller 52 after being reflected by a cylindrical mirror 27a, and reflecting mirrors 27b and 27c. The cylindrical lens 26 and the cylindrical mirror 27a refracts the stimulating ray 21A only in a plane parallel to the surface of the paper on which FIG. 1 is pointed, and by virtue of these optical elements and the cylindrical lens in the incident optical system 23, fluctuations in the scanning line pitch can be prevented even if wobbling and/or surface deflection of the rotary polygonal mirror 24 occur. Between the reflecting mirror 27c and the recording belt 1 is disposed a beam splitter 28 which transmits the major part of the stimulating ray 21A and reflects the other part. The major part of the stimulating ray 21A impinges upon the stimulable phosphor layer on the recording belt 1 to cause it to emit light. On the other hand, the part (21a) of the stimulating ray reflected by the beam splitter 28 impinges upon a grid 29A which has alternately arranged light portions and dark portions and extends in the scanning direction, and light passing through the grid 29A is collected by a light collecting rod 29B located behind the grid 29A (FIG. 1). The light collected by the light collecting rod 29B is detected by a photodetector 29C and a synchronizing signal representing the scanning position of the stimulating ray 21A thus is obtained. The recording belt 1 is conveyed leftward as viewed in FIG. 1 at a constant speed while the stimulating ray 21A scans the recording belt 1 in the main scanning direction, thereby effecting sub-scanning, and thus the recording area which was exposed to radiation in the recording section 10 in order to store a radiation image of the object thereon is exposed to the stimulating ray 21A substantially over the entire area thereof.

The parts of the recording belt 1 exposed to the stimulating ray 21A emit light according to the radiation energy stored therein, and the emitted light is detected by a photoelectric read-out means 70. In this particular embodiment, the photoelectric read-out means 70 comprises a long photomultiplier 71 which extends beyond the ends of the main scanning line of the stimulating ray 21A on the recording belt 1 and has a light receiving face opposed to the scanning line on the recording belt 1, a filter 72 which is mounted on the light receiving face of the photomultiplier 71 and selectively transmits the light emitted by the stimulable phosphor layer upon stimulation and filters out the stimulating ray which impinges upon the photomultiplier after being reflected by the recording belt 1, and a light collecting plate 73 which is mounted on the filter 72 and serves to collect the light emitted by the stimulable phosphor layer with a high efficiency. Such a photoelectric read-out means is disclosed, for instance, in U.S. Patent Application Ser. No. 141,259. The light emitted by the part of the stimulable phosphor layer exposed to the stimulating ray 21A impinges upon the photomultiplier 71 through the light collecting plate 73 and the filter 72 and is converted into an electric image signal by the photomultiplier 71. The electric image signal thus obtained is subjected to some type of predetermined image processing and delivered to an image reproducing system which may take various forms. For example, the image reproducing system may be one which reproduces the radiation image on a CRT, or one which reproduces the radiation image on a photosensitive film by scanning the film with a light beam.

There has been known a radiation image read-out method in which a read-out operation for ascertaining an outline of the image information of a radiation image stored in the stimulable phosphor layer on the recording belt (hereinafter referred to as the preliminary read out) is carried out in advance of the read-out operation for obtaining a visible image (referred to as the final read out). The final read out is carried out according to read-out conditions determined in the preliminary read out.

For example, the preliminary read out can be carried out by scanning the stimulable phosphor layer with stimulating rays having a lower stimulation energy than the stimulation energy of the stimulating ray used in the final read out, and then detecting the emitted light. See U.S. Pat. No. 4,527,060, for instance.

In the radiation image read-out section 20, both the preliminary read out and the final read out ma be carried out. In such a case, the preliminary read out first is carried out while the recording belt 1 is conveyed leftward, and then the rollers are reversed to return the recording belt 1 to the original position. Thereafter, the final read out is carried out while the recording belt 1 is conveyed leftward again. Generally, the recording belt 1 is conveyed at a higher speed during the preliminary read out than during the final read out.

After the read-out operation is completed, the recording area is fed to an erasing section 30 by the roller sections 40 and 50. The erasing section 30 comprises a housing 31 and a plurality of erasing light sources 32 accommodated in the housing 31. The erasing light sources 32 may be fluorescent lamps and are eight in number in this particular embodiment. The erasing light sources 32 in the housing 31 mainly emit light within the wavelength range which stimulates the stimulable phosphor on the recording belt 1. The residual radiation energy remaining in the stimulable phosphor layer after the image read-out operation is finished is released by exposing the whole image recording area to the erasing light while the recording belt 1 is conveyed. Reference numeral 33 denotes a filter for removing ultraviolet components from the erasing light. A lead plate 2 is disposed below the recording table 14 in order to prevent the radiation emitted from the radiation source 11 from interfering with the part of the recording belt 1 in the image read-out section 20, the erasing section 30 and the like. In the apparatus of this embodiment, the read-out operation and the erasing operation are carried out on a given recording area in parallel for a certain period. Accordingly, two pairs of nip rollers 61 and 62 are disposed on opposite ends of the erasing section 30 to prevent the erasing light from entering the image read-out section 20 along the surface of the recording belt 1. Further, in order to prevent the erasing light from leaking outside of the erasing section 30, the side of the recording belt opposite to the erasing light sources 32 and the nip rollers 61 and 62 is covered with a light shielding plate 63. Further, a roller 64 is disposed between the image read-out section 20 and the erasing section 30 to displace the recording belt 1 upward, and the roller 64 also serves to prevent the erasing light from entering the image read-out section 20.

After the erasing operation, the recording area becomes available for recording another image.

Though the tension roller 41 serves to convey the recording belt 1 in a stable way, the recording belt 1 can deteriorate in a short time if tension is imparted constantly to the recording belt 1 by the tension roller 41. Accordingly, in the apparatus of this embodiment, the force of the spring 43 acting on the tension roller 41 is removed to slacken the recording belt 1 when desired.

That is, when the apparatus is operated, the support plate 43a to which the spring 43b is connected at one end is moved by means of said motor 44a, gears 44b and 44c, and screw rod 44d to a predetermined position where the tension roller 41 is urged under the force of the spring 43b to tense the recording belt 1. When the recording belt 1 is to be slackened, the motor 44a is reversed to move the support plate 43a upward by a large distance, thereby slackening the spring 43b. When the spring 43b is slackened, the roller 41 is released, and the recording belt 1 is slackened. By keeping the recording belt in this state when the apparatus is not operated, deterioration of the recording belt 1 can be suppressed. The release of tension from the recording belt 1 may be effected in any manner. For example, the tension on the recording belt 1 may be released by energizing the motor 44a by operating a manual switch at a suitable time, e.g., when operation of the apparatus for the day is completed, and the tension may be imparted to the recording belt 1 again by operating the switch when the apparatus is to start operating. Otherwise, the tension may be released automatically by use of a timer, which determines when the apparatus has not been operated for a predetermined time interval, and may be imparted automatically to the recording belt 1 when the apparatus is started.

Since the distance between the roller sections 40 and 50 which defines the length of the recording belt 1 to be conveyed during the recording of each radiation image is set to be substantially equal to the length of the largest image which can be recorded by the apparatus when the radiation image recording section 10 is disposed above the recording belt 1 and the image read-out section 20 and the erasing section 30 are disposed below the recording belt 1, the length of the overall apparatus can be as small as the length of the largest image, whereby the overall size of the apparatus can be reduced. Further, since the stimulating ray 21A scans the recording belt 1 on the peripheral surface of a roller on which the running of the recording belt 1 is most stable, the scanning operation can be optimized.

The stimulable phosphor layer need not be provided over the entire area of the recording belt 1, but one or more stimulable phosphor layers may be provided on one or more parts of the recording belt 1. It is preferred from the viewpoint of the miniaturization of the apparatus that the distance between the most remote edges of the two roller sections be not larger than 1.5 times the largest radiation image which can be recorded by the apparatus. The housing of the apparatus may be relatively small or large in size. Further, the recording table may be extended sideways as shown by the chained line in FIG. 1 to facilitate supporting the object.

A second embodiment of the present invention will be described with reference to FIGS. 4 to 6, hereinbelow. The parts analogous to the parts in the first embodiment will be given the same reference numerals and will not be described in detail here.

In the apparatus of the second embodiment, the recording belt conveying roller system for conveying the recording belt 1 comprises first and second roller sections 140 and 150, a pair of idle rollers 161 and 162, and two pairs of nip rollers 61 and 62. The first roller section 140 includes an upper roller 141 which functions as a tension roller (sometimes referred to as the tension roller 141), and a lower roller 142. The second roller section 150 includes an upper roller 151 and a lower roller 152. The two pairs of nip rollers 61 and 62 are on respective ends of the erasing section 30. The center-to-center distance between the roller sections 140 and 150 is substantially equal to the length of the largest radiation image recorded on the recording belt 1 in the radiation image recording section. The idle rollers 161 and 162 are connected by a connecting member 163 and are moved left and right integrally with each other by a driving means (not shown). The recording belt 1 is passed around the idle roller 161 between the upper and lower rollers 141 and 142 of the first roller section 140 along the face opposed to the idle roller 162. Similarly, the recording belt 1 is passed around the idle roller 162 between the upper and lower roller 151 and 152 of the second roller section 150 along the face opposed to the idle roller 161. As in the first embodiment, the tension roller 141 is urged by a spring 43b to tense the recording belt 1 when the apparatus is in operation and is released as desired.

Figure 4:
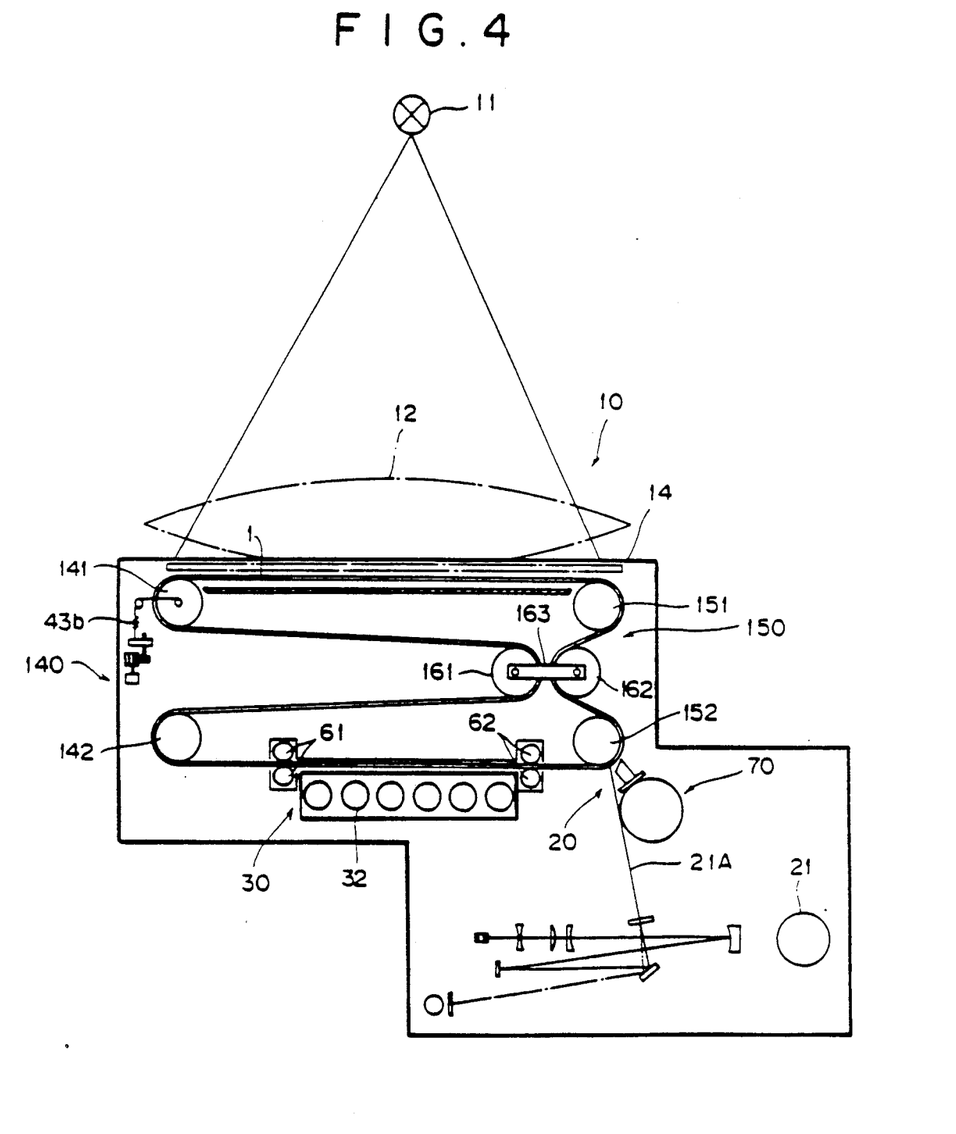
FIG. 4 is a schematic side view showing a radiation image recording and read-out apparatus in accordance with a second embodiment of the present invention.

In the apparatus shown in FIG. 4, a plurality of recordings are carried out with a high efficiency by moving the idle rollers 161 and 162 left and right integrally with each other. Now the relation between the position of the idle rollers 161 and 162 and the operation of each section in the apparatus will be described with reference to FIGS. 5(a) to 5(g) and FIGS. 6(a) to 6(h).

Figure 5A:
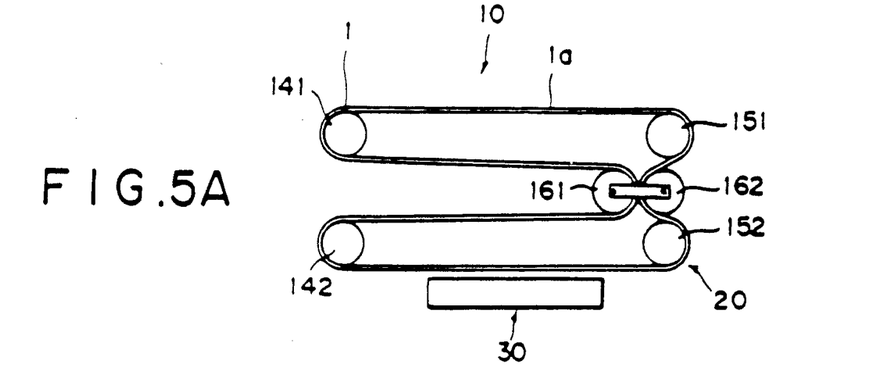
FIGS. 5(a) to 5(g) and FIGS. 6(a) to 6(h) are schematic views for illustrating the relation between the position of the idle rollers and the operation of each section in the apparatus of the second embodiment.
Figure 5B:
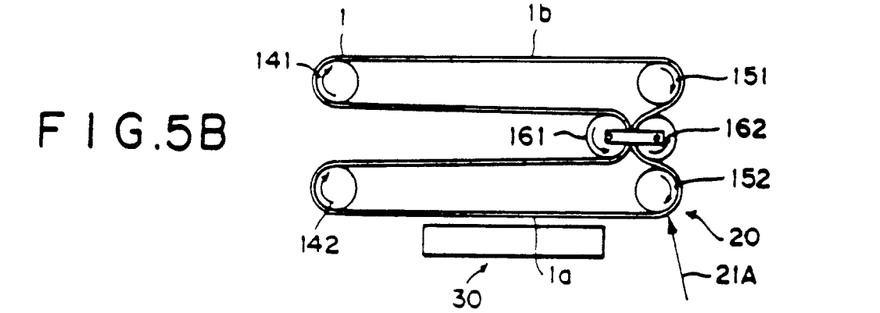

The recording of relatively small radiation images on the recording belt 1 first is described with reference to FIGS. 5(a) to 5(g). When the apparatus starts to operate, the idle rollers 161 and 162 are positioned at the right as shown in FIG. 5(a). The recording of a first image is carried out in this state. The first recording area, that is, the area which is exposed to radiation when the first image is recorded, is the hatched area 1a.

Figure 5C:
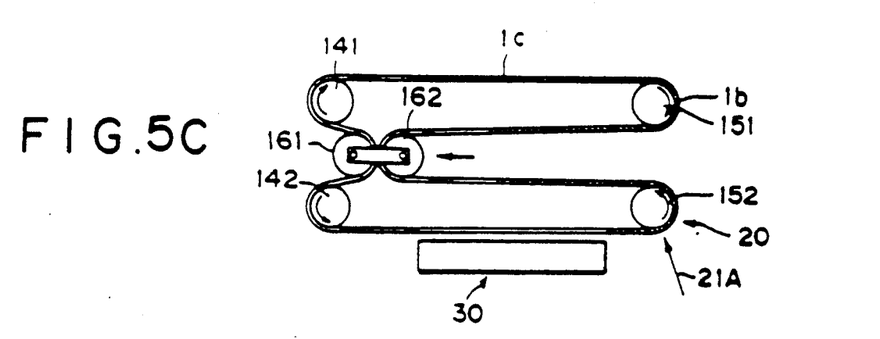

When the recording of the first image is completed, the first recording area la is conveyed to the image read-out section 20 by rotating the rollers, and the preliminary read out is carried out with the erasing light sources in the erasing section 30 off. When the preliminary read out of the first recording area la is completed, the recording of a second image is carried out on the area 1b of the recording belt 1, which area is positioned in the recording position upon completion of the preliminary read out of the first recording area la. Since the recording belt 1 is conveyed at a relatively high speed during the preliminary read out as described above, the recording of the second image can be carried out in a relatively short time after completion of the recording of the first image. When the second recording is completed, the idle rollers 161 and 162 are moved leftward as shown in FIG. 5(c). This returns the first recording area 1a to the read-out start position (the position in which the recording area is to be positioned when the read out is started) and at the same time brings a third recording area 1c to the recording position. Then, the recording of a third image is carried out on the third recording area 1c.

Figure 5D:
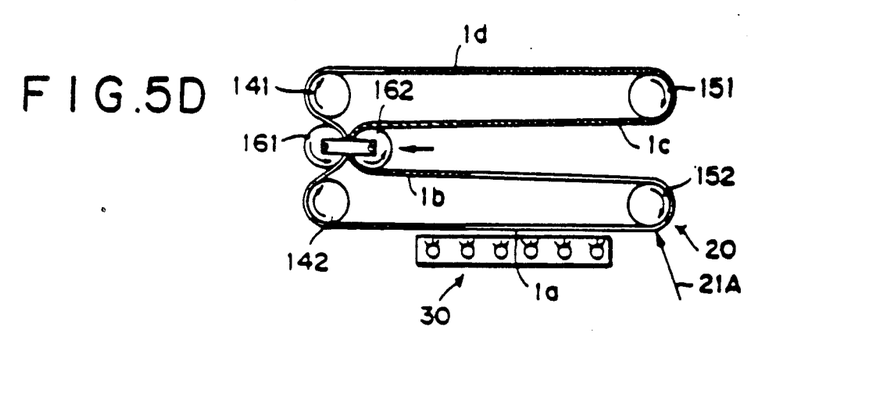

Thereafter, the final read out is carried out on the first recording area in the image read-out section 20 while the rollers are rotated in the direction shown by the arrows in FIG. 5(d). At the same time, the idle rollers 161 and 162 are moved to the left as shown in FIG. 5(d) while the upper rollers 141 and 151 are rotated slightly faster than the other rollers, whereby a new recording area is brought to the recording position. Thus, a fourth recording area 1d adjacent to the third recording area 1c is brought to the recording position by rotation of the rollers and the movement of the idle rollers 161 and 162 at the time when the read out of the recording area 1a progresses to the position shown in FIG. 5(d). Thus, the recording belt 1 is ready for the recording of a fourth image.

Figure 5E:
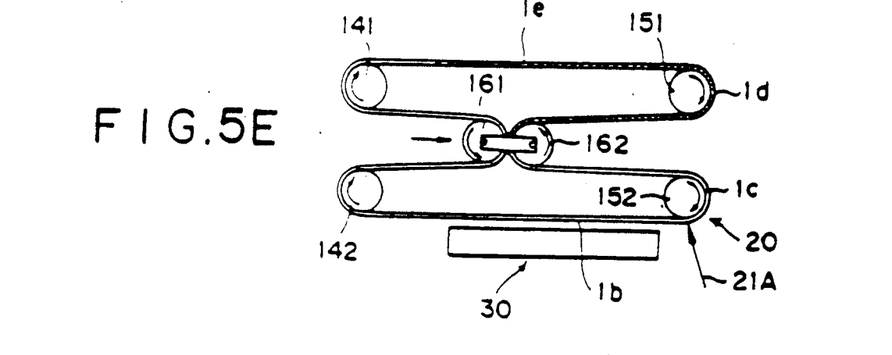
Figure 5F:
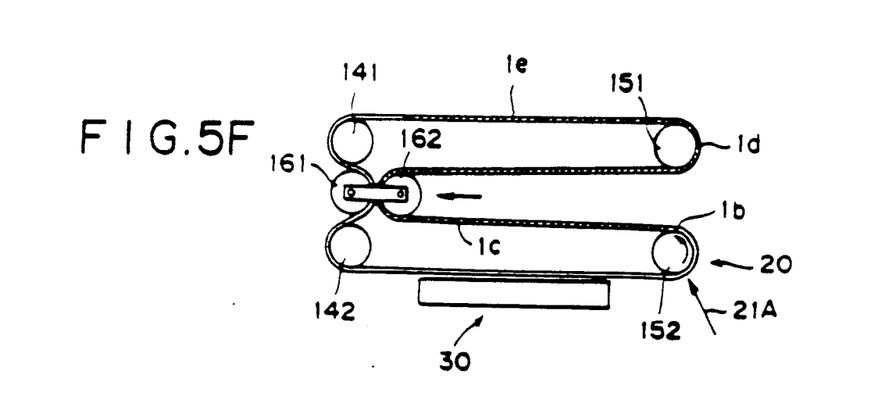

The recording belt 1 is ready for the recording of a fifth image when the final read out of the first recording area 1a is finished and the preliminary read out of the second recording area 1b is finished. However, since there is a blank between the first and second recording areas 1a and 1b and the recording belt 1 is conveyed by a length larger than the length of one image frame by the time the preliminary read out of the second recording area 1b is finished, the idle rollers 161 and 162 are moved rightward as shown in FIG. 5(e) until the preliminary read out of the second recording area 1b is finished in order to allot an area adjacent to the fourth recording area 1d for a fifth recording area 1e. When the preliminary read out of the second recording area 1b is finished, the idle rollers 161 and 162 are moved to the left as shown in FIG. 5(f), whereby the second recording area 1b is returned to the read-out start position. At this time, the fifth recording area 1e is held in the recording position. Accordingly, the fifth recording can be carried out any time between the state shown in FIG. 5(e) and the state shown in FIG. 5(f).

Figure 5G:
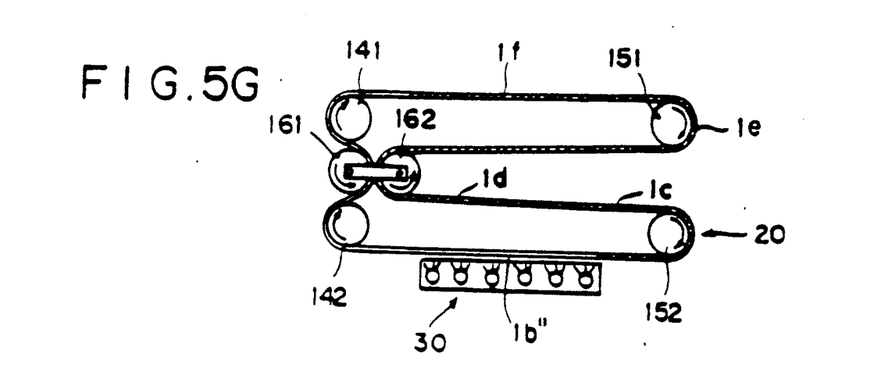

The recording of a sixth image on a sixth recording area 1f adjacent to the fifth recording area 1e can be carried out after the final read out of the second recording area 1b is finished as shown in FIG. 5(g). The sixth recording area 1f is held in the recording position until the preliminary read out of the third recording area 1c is carried out (after the final read out of the second recording area 1b) and the third recording area 1c is returned subsequently to the read-out start position. Accordingly, the recording of a sixth image can be carried out any time in this period.

Now the relation between the position of the idle rollers 161 and 162 and the operation of each sections in the apparatus for the recording of the largest-sized radiation images will be described with reference to FIGS. 6(a) to 6(h).

Figure 6A:
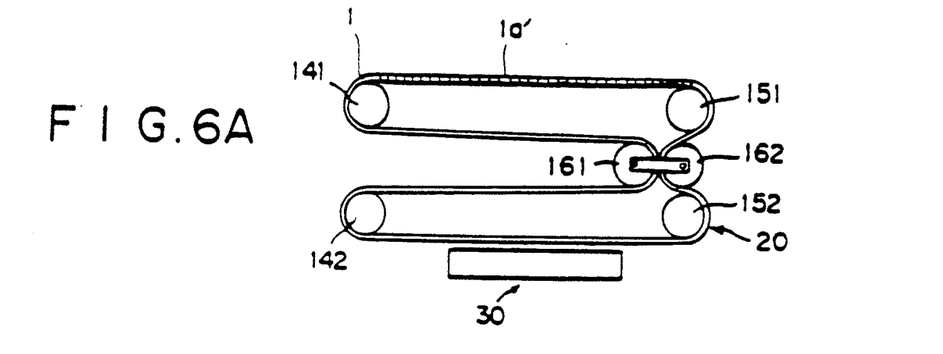
Figure 6B:
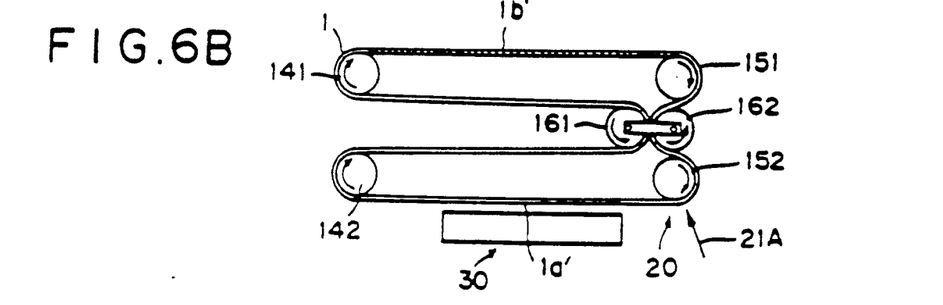
Figure 6C:
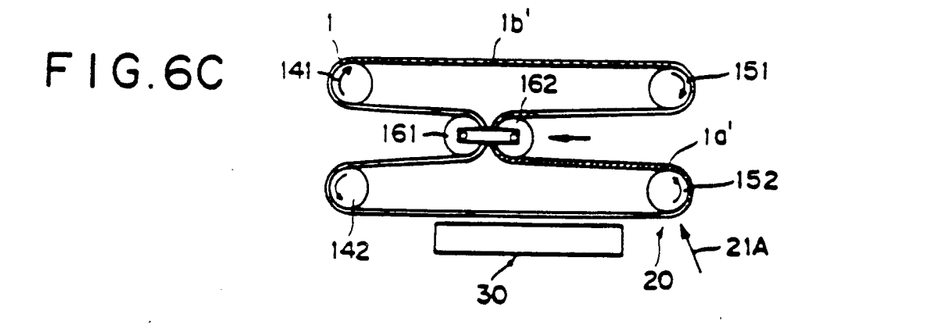

When the apparatus starts to operate, the idle rollers 161 and 162 are positioned to the right as shown in FIG. 6(a), and the recording of a first image is carried out on a first recording area 1a' in this state, the first recording area 1a' covering the whole upper run of the recording medium. When the recording of a first image is finished, the rollers are rotated in their respective positions to convey the recording belt 1 to a position in which the preliminary read out of the first recording area 1a' is completed as shown in FIG. 6(b). When the recording belt 1 reaches this position, the recording of a second image can be carried out on the recording area 1b' which is in the recording position at the time when the recording belt 1 reaches the position shown in FIG. 6(b). Then, the idle rollers 161 and 162 are moved leftward to return the first recording area 1a' to the read-out start position as shown in FIG. 6(c). The recording of a second image on the second recording area 1b' may be carried out any time after the final read out of the first recording area 1a' is started and before a third recording area is brought to the recording position. This minimizes the cycle time.

Figure 6D:
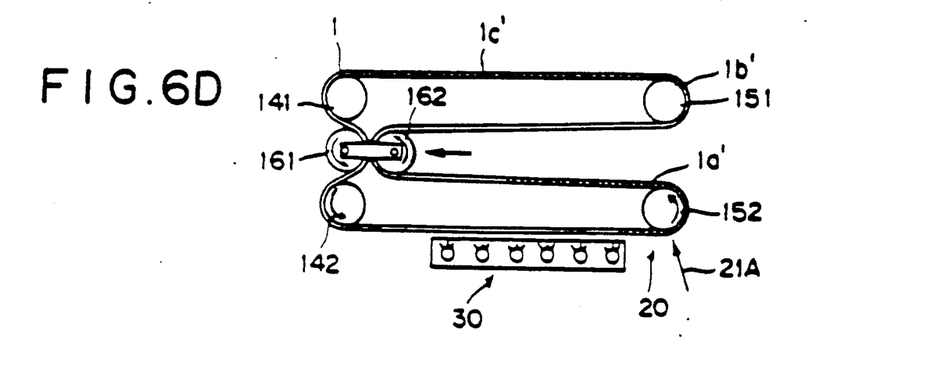
Figure 6E:
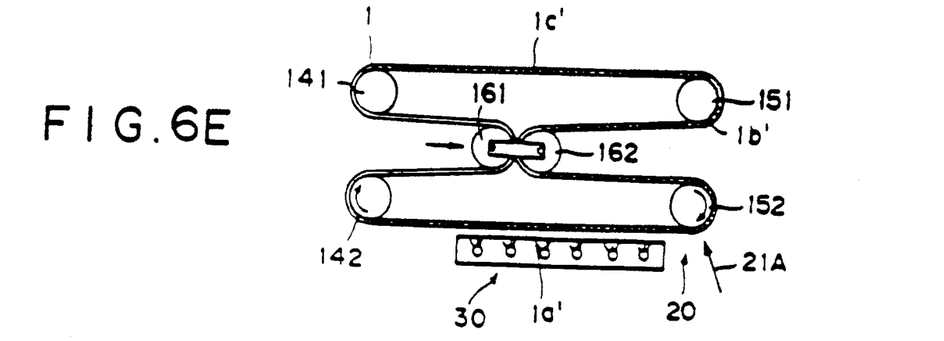

Thereafter, the final read out of the first recording area 1a' is carried out in the image read-out section 20 while the recording belt 1 is conveyed at a constant speed by rotating the rollers in the direction shown in FIG. 6(d). At the same time, the idle rollers 161 and 162 are moved to the left while the upper rollers 141 and 151 are rotated faster than the other rollers, whereby a third recording area 1c' adjacent to the second recording area 1b' is fed toward the recording position. The third recording area 1c' is wholly positioned in the recording position when the final read out of the first recording area 1a' progresses to the position shown in FIG. 6(d). Thereafter, the idle rollers 161 and 162 are moved gradually rightward in response to the rotation of the lower roller 152 as shown in FIG. 6(e) until the final read out of the first recording area 1a' is finished. Accordingly, it is preferred that the recording of a third image on the third recording area be carried out between the state shown in FIG. 6(d) and the state shown in FIG. 6(e).

Figure 6F:
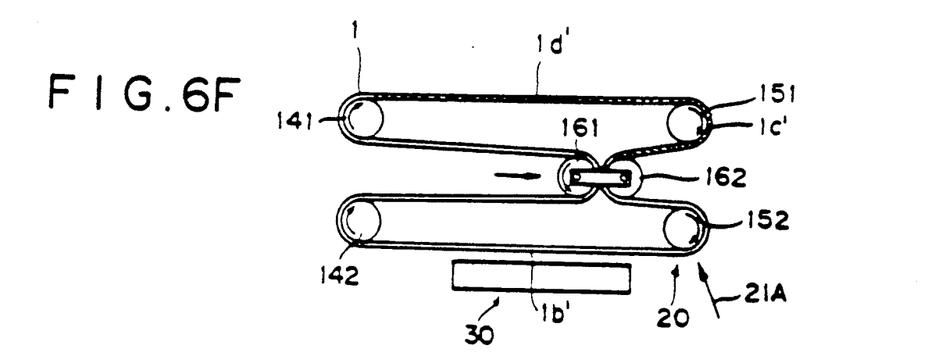
Figure 6G:
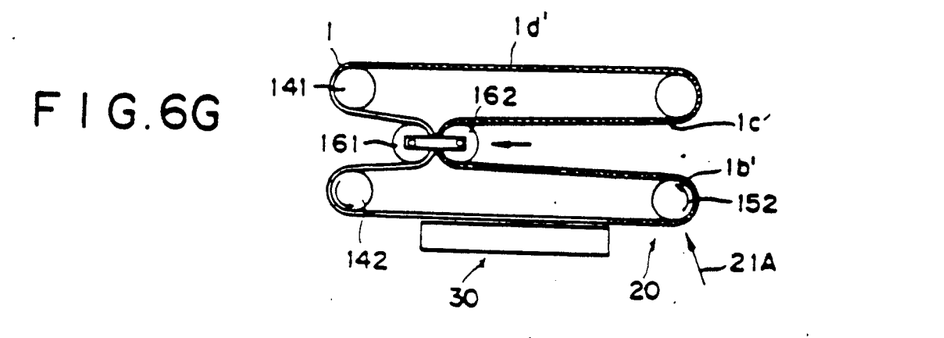

The recording of a fourth image on an area 1d' adjacent to the third recording area 1c' can be carried out when the preliminary read out of the second recording area 1b' is finished as shown in FIG. 6(f). At this time, the idle rollers 161 and 162 are moved slightly rightward in order to adjust the feed of the recording areas 1d' and 1b'. Then the second recording area 1b' is returned to the read-out start position by the leftward movement of the idle rollers 161 and 162 as shown in FIG. 6(g). Accordingly, it is preferred that the recording of the fourth image on the fourth recording area 1d' be carried out between the state shown in FIG. 6(f) and the state shown in FIG. 6(g).

Figure 6H:
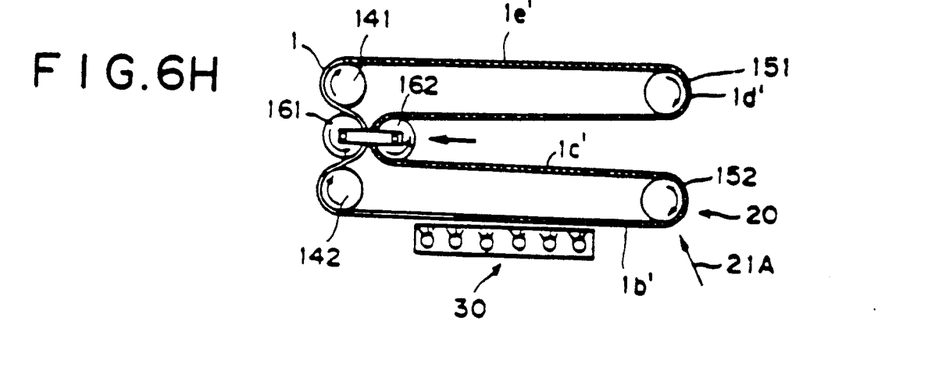

The final read out of the second recording area 1b' then is carried out, and at the same time, the idle rollers 161 and 162 are moved to the left with the upper rollers 141 and 151 rotating faster than the other rollers, whereby an area 1e' adjacent to the fourth area 1d' is brought to the recording position, as shown in FIG. 6(h). As the final read out of the second recording area 1b' progresses, the idle rollers 161 and 162 begin to move leftward again and the recording of a fifth image can be carried in this state.

As can be understood from the description above, by virtue of the idle rollers which are disposed between the upper and rollers and the lower rollers and are movable to the left and to the right, image recording in the radiation image recording section and image read out in the image read-out section can be carried out simultaneously, and accordingly, in accordance with this embodiment, a plurality of recordings can be carried with a high efficiency.

Though, in either of the first and second embodiments, it is much preferred from the viewpoint of miniaturization of the apparatus that the photoelectric read-out means comprises a long photomultiplier, the photoelectric read-out means need not be limited to such a means but may comprise, for instance, a light collecting member having a light input end face extending along the main scanning line and a light output end face rolled into a cylinder, and a relatively small photomultiplier connected to the light output end face of the light collecting member. Such a structure is known in the art.

Though, in the first and second embodiments described above, deterioration of the recording belt 1 is minimized by releasing the tension on the recording belt 1 when the apparatus is not in operation, deterioration of the recording belt 1 can be minimized by conveying the recording belt even when the apparatus is not in operation as in third and fourth embodiments described hereinbelow with reference to FIGS. 7 to 9.

Figure 7:
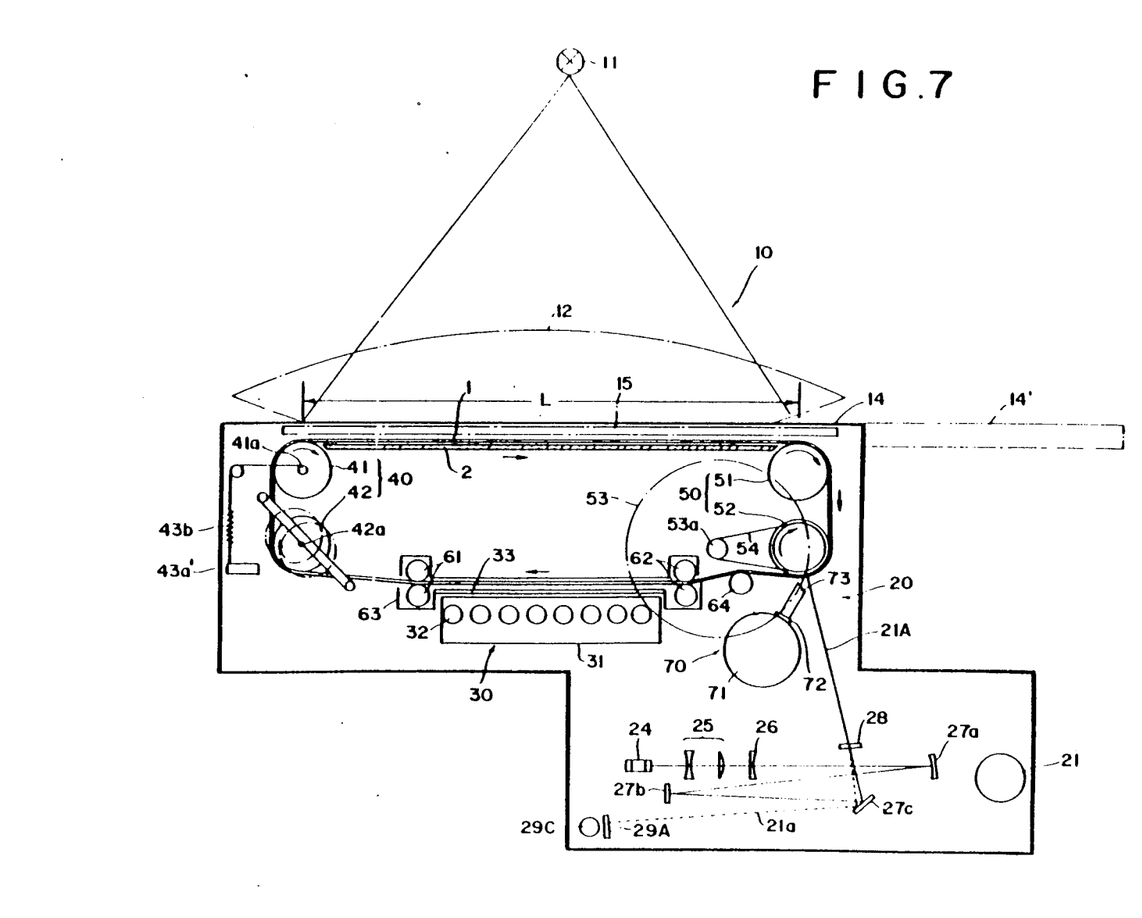
FIG. 7 is a view similar to FIG. 1 but showing a third embodiment of the present invention.
Figure 8:
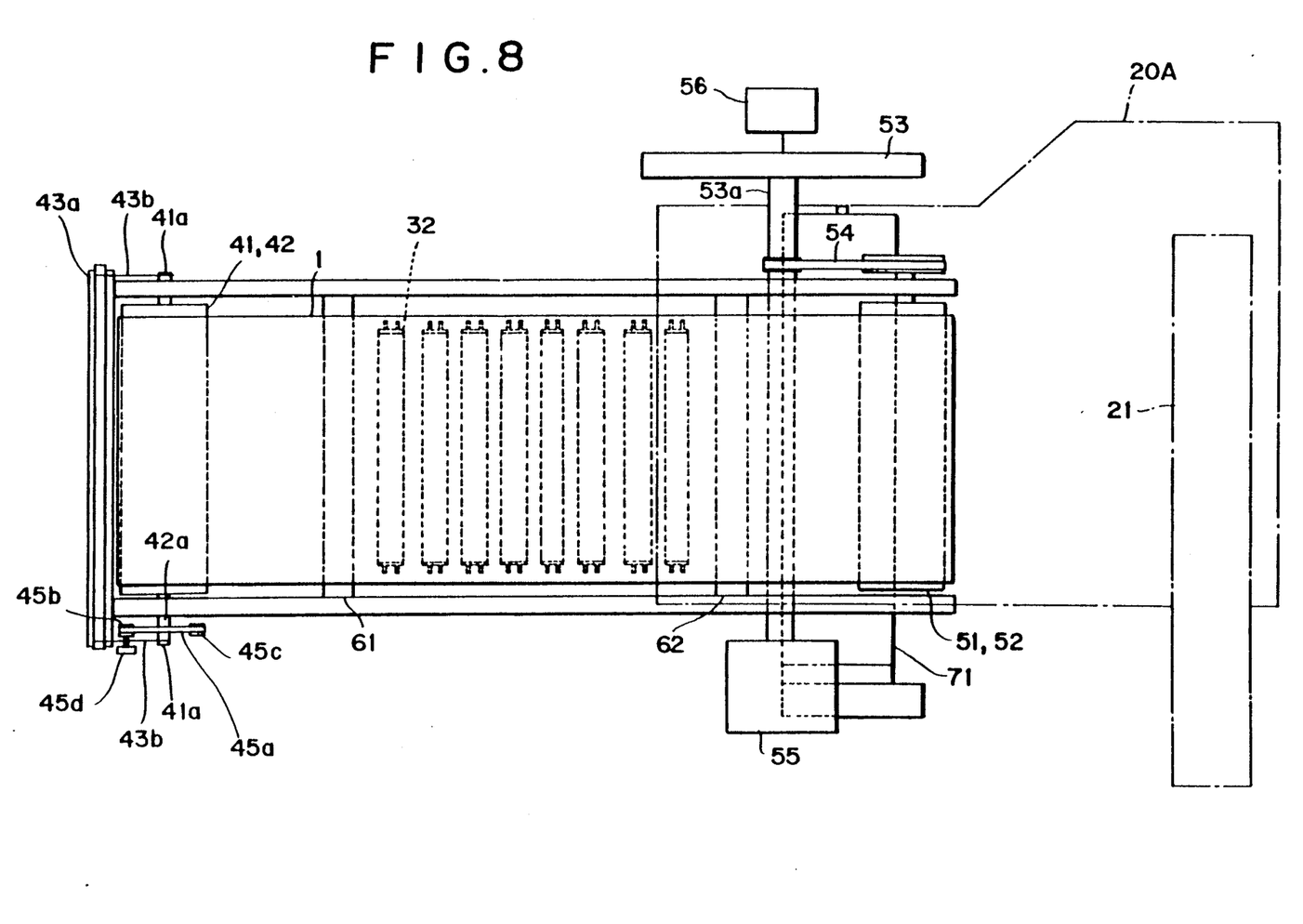
FIG. 8 is a view similar to FIG. 2 but showing a part of the apparatus in accordance with the third embodiment.

The third embodiment shown in FIGS. 7 and 8 is very similar to that shown in FIGS. 1 to 3, and accordingly, the parts analogous to those shown in FIGS. 1 to 3 are given the same reference numerals and only the differences between the first and third embodiments will be described herein below.

In the first embodiment, the spring 43b for urging the tension roller 41 is connected to the support plate 43a which is movable up and down. The support plate 43a is moved upward to slacken the spring 43b and to release the tension on the recording belt 1 when the apparatus is not in operation. On the other hand, in the third embodiment, the spring 43b is connected to a support plate 43a' which is stationary, and accordingly, the recording belt 1 is tensed constantly under the force of the spring 43b. However, a battery (FIG. 8) is provided in the apparatus and the motor 53 for driving the roller 52 is connected to the battery 56 when the main power source is cut and drives the roller 52 to convey the recording belt 1 in a standby conveyance mode. In this particular embodiment, the recording belt 1 is kept moving at a low speed, thereby preventing bending stress from being concentrated for a long time on particular parts of the recording belt and extending the service life of the recording belt. Instead of being conveyed at a low speed, the recording belt may be intermittently conveyed. In such a case, the rate of feed, the interval of feed and the like are determined suitably according to the type of material used in the recording belt, the curvature of the rollers, the normal waiting period, and the like.

Further, instead of providing a battery, the apparatus may be arranged so that the motor 53 is driven by the main power source to convey the recording belt in the standby conveyance mode when the apparatus is not in operation.

Figure 9:
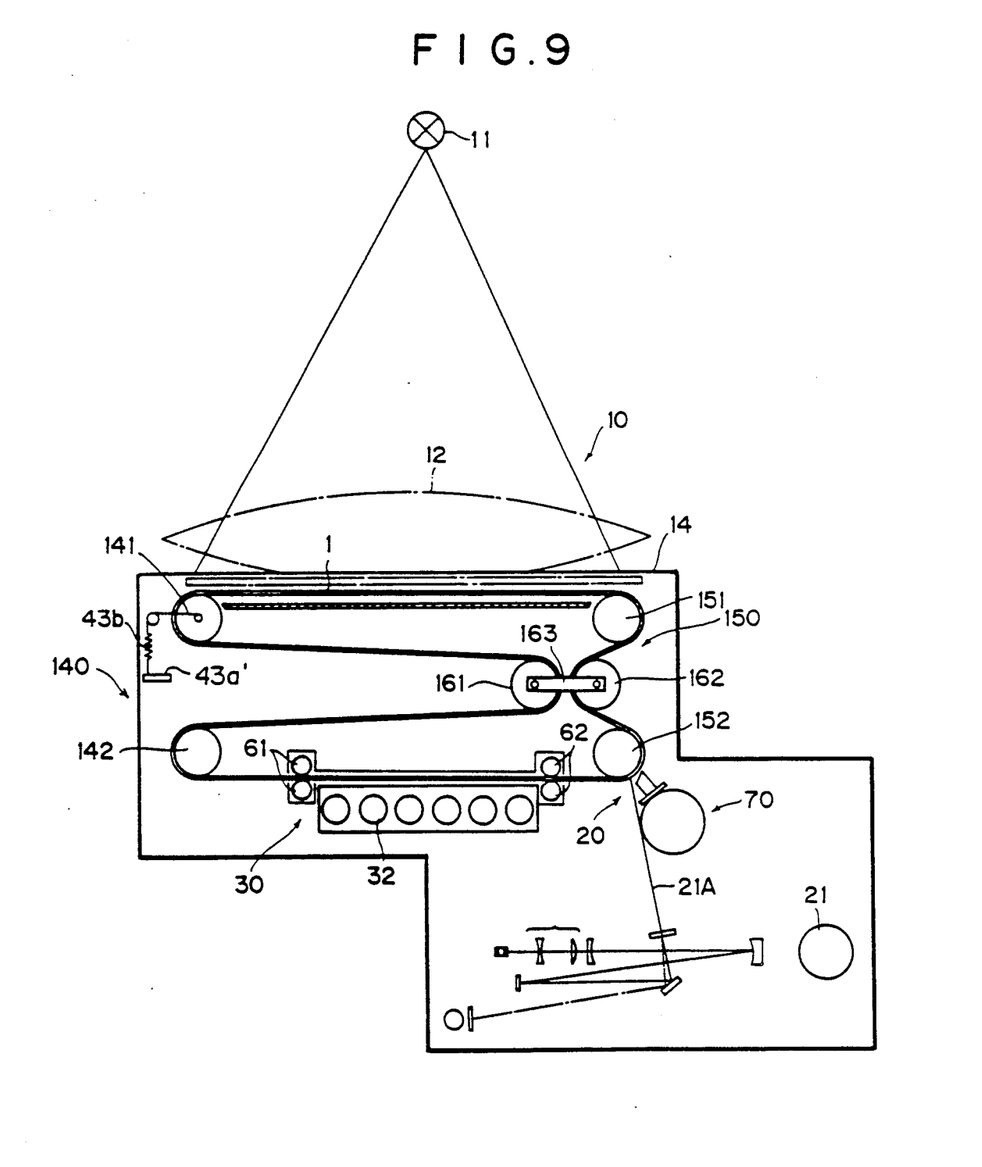
FIG. 9 is is a view similar to FIG. 4 but showing a fourth embodiment of the present invention.

The fourth embodiment shown in FIG. 9 is very similar to that shown in FIG. 4 and accordingly, the parts analogous to those shown in FIG. 4 are given the same reference numerals and only the differences between the second and fourth embodiments will be described herein below.

As in the third embodiment, the spring 43b is connected to a support plate 43a' which is stationary, and accordingly, the recording belt 1 is tensed constantly under the force of the spring 43b. However, the apparatus is arranged so that the motor 53 is driven by the main power source to convey the recording belt in the standby conveyance mode when the apparatus is not in operation.

In the third and fourth embodiments, by using a timer the apparatus may be switched automatically to the standby conveyance mode when it is not operated for a predetermined time interval.

I claim:

1. A radiation image recording and read-out apparatus comprising:
    a recording belt in the form of an endless belt having a stimulable phosphor layer,
    a recording belt conveying roller system which comprises a plurality of rollers around which the recording belt is passed and which conveys and circulates the recording belt,
    an image recording section in which the stimulable phosphor layer on the recording belt is exposed to radiation which has passed through an object in order to store a radiation image of the object therein,
    an image read-out section comprising a stimulating light source which emits stimulating light for scanning the stimulable phosphor layer and a photoelectric read-out means which reads out light emitted from the stimulable phosphor layer in response to being scanned by the stimulating light and which obtains an electric image signal, and
    an erasing section which eliminates residual radiation energy on the stimulable phosphor layer after read out of the radiation image in the image read-out section and before another radiation image is recorded thereon,
    said recording belt conveying roller system being provided with a tension roller which is urged by an urging means to outwardly tension the recording belt, and
    the urging means being connected to a tension releasing means which cause the urging means to release the tension roller, wherein said recording belt conveying roller system includes a pair of roller sections which are spaced from each other by a predetermined distance which is not shorter than the length of the largest-sized radiation image which can be recorded in the recording section and not longer than 1.5 times the same and in which the recording belt is circulated between the roller sections along the predetermined distance.

2. A radiation image recording and read-out apparatus, comprising:
    a recording belt in the form of an endless belt having a stimulable phosphor layer;
    a recording belt conveying roller system which comprises a plurality of rollers around which the recording belt is passed and which conveys and circulates the recording belt at a predetermined speed, said recording belt conveying roller system being provided with a tension roller which is urged by an urging means to outwardly tense the recording belt, and conveying means for conveying the recording belt either continuously, at a speed less than said predetermined speed, or intermittently, when the apparatus is inoperative;
    an image recording section in which the stimulable phosphor layer on the recording belt is exposed to radiation which has passed through an object in order to store a radiation image of the object therein;
    an image read-out section comprising a stimulating light source which emits stimulating light for scanning the stimulable phosphor layer and a photoelectric read-out means which reads out light emitted from the stimulable phosphor layer in response to being scanned by the stimulating light and which obtains an electric image signal; and
    an erasing section which eliminates residual radiation energy on the stimulable phosphor layer after read out of the radiation image in the image read-out section and before another radiation image is recorded thereon.

3. A radiation image recording and read-out apparatus as defined in claim 2, in which said recording belt conveying roller system includes a pair of roller sections which are spaced from each other by a predetermined distance which is not shorter than the length of the largest-sized radiation image which can be recorded in the recording section and not longer than 1.5 times the same and in which the recording belt is circulated between the roller sections along the predetermined distance.

4. A radiation image recording and read-out apparatus as defined in claim 2, further comprising detecting means for detecting when said radiation image recording and read-out apparatus is not operated for a predetermined time interval; and a timer which switches said recording belt conveying roller system automatically to operate either continuously, at a speed less than said predetermined speed, or intermittently, when said detecting means detects that said radiation image recording and read-out apparatus is not operated for said predetermined time interval.

5. A radiation image recording and read-out apparatus as defined in claim 2, wherein said urging means comprises a spring.

* * * * *